United States Patent [19]
Farley

[11] 3,906,253
[45] Sept. 16, 1975

[54] POWER-REGULATED THERMOSTAT CONTROL SYSTEM FOR HEATING/COOLING USE

[75] Inventor: Ray Scott Farley, Wichita, Kans.

[73] Assignee: The Coleman Company, Inc., Wichita, Kans.

[22] Filed: Aug. 30, 1974

[21] Appl. No.: 501,883

Related U.S. Application Data

[63] Continuation of Ser. No. 416,389, Nov. 16, 1973, abandoned.

[52] U.S. Cl. .................... 307/117; 165/26; 236/91; 236/68 B
[51] Int. Cl.² ........................................ F25B 29/00
[58] Field of Search ............ 307/116, 117; 219/490, 219/491, 501, 507, 509, 511; 340/221; 165/27, 28, 25, 26; 236/91, 68 B; 337/377

[56] References Cited
UNITED STATES PATENTS 3,667,539 * 6/1972 Sweger.................................. 165/26
3,785,433 1/1974 Ballard................................... 165/27
3,799,433 3/1974 Bauer et al......................... 236/68 B Primary Examiner—Herman Hohauser
Attorney, Agent, or Firm—Dawson, Tilton, Fallon & Lungmus

[57] ABSTRACT

For an AC supply, a pair of rectifier diodes are connected in parallel in opposing polarity, and the pair of diodes are connected across a heat anticipator resistor which is connected in series with a bimetal switch. The heat anticipator resistor and the bimetal switch are in series with the load. When the system is operating in the heating mode, the diodes regulate the voltage across the heat anticipator thereby rendering anticipator power (and, hence, cycle rate) independent of load current. Thus, there is no need to adjust the heat anticipator resistor during installation. When the system operates in the cooling mode, a lower current is required in the heat anticipator to reduce the cycling rate; and the system operating point shifts accordingly.

4 Claims, 4 Drawing Figures

POWER-REGULATED THERMOSTAT CONTROL SYSTEM FOR HEATING/COOLING USE

RELATED APPLICATION

This ia a continuation application of copending application Ser. No. 416,389, filed Nov. 16, 1973 now abandoned.

BACKGROUND AND SUMMARY

The present invention relates to heating and air conditioning systems in general; and it has particular applicability to heating/cooling systems of the type used in mobile homes, motor homes, and the like. In systems for such use, a furnace manufacturer normally provides a furnace, such as an electric or gas furnace, which is adapted to be converted for air conditioning; but the furnace manufacturer does not normally provide the air conditioning. The air conditioning is added to the system as an "after sale" or add-on item.

The thermostat systems normally employ a heat anticipator. This is a circuit resistive element which is connected in circuit with the source of power when the thermostat closes (calling for hot or cool air). For example, when the system is operating in the heat mode, and the bimetallic switch closes, a power is fed to the heat anticipator resistor which generators heat within the casing of the thermostat, eventually causing the bimetallic siwtch to re-open, before the room temperature has actually reached the setting indicated. This de-energizes the heat controller which feeds fuel to the furnace and may control the blower.

A typical system will be set up to provide six heating cycles per hour. That is to say, if the thermostat is enclosed in a perfectly insulated test room with no furnace supplying heat, the bimetallic switch will open and close 6 times per hour. The ambient temperature in the room causes the bimetallic switch to close, and the heat generated by the anticipator resistor causes the bimetallic switch to open. When the system is switched to cooling, it is desirable to reduce the number of operating cycles to three per hour.

Each manufacturer providing a furnace includes a heat controller or "sequencer" which draws a particular current when operating. In practice, the current drawn by the heat controller may vary, depending upon the manufacturer, from 0.15 amps minimum to 0.80 amps maximum. As used herein, "heat controller" is a rather broad term indicating the amount of current drawn during the operation of the heating apparatus, whether it is by a gas solenoid or relay or whatever. Thus, the thermostat must be "tuned" to the current requirements for the heat controller to provide the correct power for the heat anticipator resistor in order to achieve the desired number of cycles during heating. It has thus been the practice to provide an adjustable resistor for the heat anticipator resistor in the thermostat which can be set to a desired value of resistance so as to provide the proper amount of anticipation heat in the thermostat, for a given heat controller current. If the adjustable heat anticipator resistor is not set to the proper value, the number of operating cycles per hour will be greater than or less than the desired number.

When the system is turned to air conditioning, there is normally a function inverter in the system such that when the bimetallic switch in the thermostat is open (indicating that the ambient temperature in the room is above the set value by a small amount), the compressor is turned on. When the bimetal switch is open, the compressor is on, and the heat anticipator resistor is out of circuit. Eventually, the cool air provided by the compressor in the room will reduce the temperature, and cause the bimetallic switch to close, thereby de-energizing the compressor and connecting the anticipator in circuit. The heat generated by the anticipator thus tends to turn the compressor back on. As mentioned, in the cooling mode, it is desirable to have a reduced operating cycle rate, for example, three cycles per hour rather than six as for the heating mode. The cycle rate is proportional to power dissipation in the heat anticipator.

In a system of this type, the thermostat current is set for operation in the heating mode so as to achieve six to eight operating cycles per hour; and the thermostat current must be reduced to 70 percent of that value in the cooling mode in order to achieve three-four operating cycles per hour. This is because the heat (power dissipation) in the anticipator is a function of the square of the current.

As will be explained more fully within, one system for operating in this manner uses a resistor connected in parallel with a coil of a relay in the heating mode so as to draw extra current through the heat anticipator, and to disconnect the resistor in the cooling mode, thereby reducing thermostat current. The relay includes one set of normally open contacts for operating the heat controller and one set of normally closed contacts for operating the air conditioner. In order to have the power reduced to one-half during cooling, the relay coil current must be 70 percent of the total current.

When adding air conditioning, then, to an existing system, a new thermostat is normally installed, and this requires an adjustment of the anticipator resistor. It is well known in the industry that even though the adjustment required to tune a particular thermostat to a heat controller is rather simple (merely requiring the setting of the heat anticipator resistor); nevertheless, this adjustment is very seldom made in actual practice, when incorporating air conditioning. The reasons for this are not clear, but it does present a problem in that operating cycle times will be different than those for which the system is designed. The failure of the installer to regularly adjust the heat anticipator resistor in the thermostat when installing air conditioning has thus become a rather serious problem since it affects system operation. The problem is further complicated because, as mentioned above, the heat anticipator resistor must be set to a particular value depending upon the current value drawn by the heat controller for the manufacturer who provided the furnace; and this value can range, as mentioned, between 0.15 and 0.80 amps.

One of the principal advantages of the present invention, then, is that the heat anticipator resistor need not be adjusted when modifying the system to include air conditioning. The invention is useful whether the furnace control operates on AC or DC supply voltage. For an AC supply, a pair of rectifier diodes are connected in parallel in opposing polarity, and the pair of diodes are connected across the heat anticipator resistor. These three elements, connected in parallel, are then connected in series with the source, the bimetallic switch, the heating/cooling switch, and the load. When the heating/cooling switch is set for heat, the load is the heat controller. When it is set for cooling, the load may be a fixed resistor having a higher impedance value than the heat controller; and in this case, a function inverter, described more completely within, actuates the air conditioning apparatus.

The pair of diodes regulate the power fed to the heat anticipator when the bimetal switch is closed. When the system is operating in the heating mode, a greater load current is called for, and the diodes conduct, shunting load current around the anticipator resistor in excess of what is required for proper heat cycling. This regulates the power of the anticipator and renders it insensitive to fluctuations in source voltage on load current. When cooling is required, a lower load current is called for, and the diodes are then operated in a non-conducting region. The current in the heat anticipator resistor is also lowered to a design value, thereby reducing the operating cycle rate.

Because the diodes conduct (and thus regulate power) above a known current value in the heating mode, there is no need to adjust the heat anticipator resistor; and in modifying the system for air conditioning, no modifications are necessary in the thermostat if the diodes were incorporated in the thermostat originally. Otherwise, it is a simple matter to install a new thermostat having the diodes. In either case, the new theromostat may be used for all values of current in the heat controller in the range 0.15–0.80 amps, and the resulting cycle rate will be within an acceptable range due to the regulating effect of the diodes.

A system has been disclosed for regulating the current flow through the heat anticipator resistor independent of such fluctuations, and it is described in U.S. Pat. NO. 3,629,607, issued Dec. 21, 1971. However, the regulation is accomplished by moving the heat anticipator resistor into a circuit branch in parallel with the load and by providing a Zener diode for regulating power to the heat anticipator resistor. This requires a third wire connection to the thermostat and in converting to air conditioning, it is often quite difficult to add a third wire to the thermostat because it will have to be run from the thermostat to the furnace.

The present invention therefore provides a simple thermostat for replacement of an existing one while converting a heating system for air conditioning while, at the same time, providing power regulation in the heat anticipator resistor to render the operating cycle time independent of fluctuations in supply voltage or load current. In addition, the present invention does not require any special adjustment of the heat anticipator resistor when a system is converted to air conditioning, irrespective of the type of heat controller that may have originally been employed as long as the current drawn by the controller is within the design range of 0.15–0.80 amps. This obviates the problems encountered when installers do not make the heretofore required adjustment of the heat anticipator resistor.

Other features and advantages of the present invention will be apparent to persons skilled in the art from the following detailed description of a preferred embodiment accompanied by the attached drawing.

THE DRAWING

DETAILED DESCRIPTION

Figure 1:
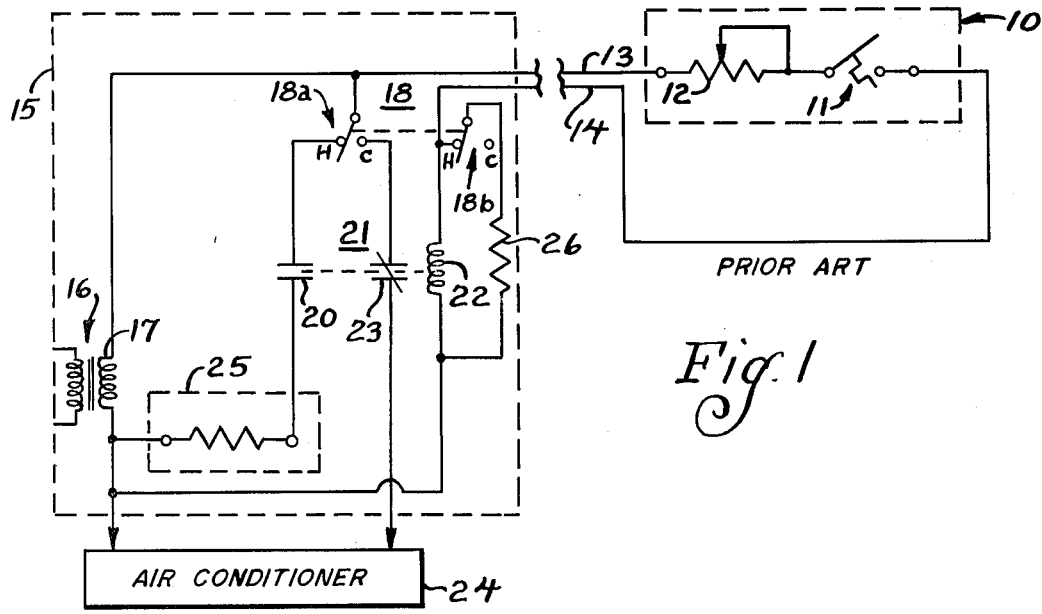
FIG. 1 is a circuit schematic diagram of a prior art system adapted for both heating and cooling.

Turning first to FIG. 1, reference numeral 10 generally designates a standard two-wire thermostat including a bimetallic switch 11 and a manually-adjustable heat anticipator resistor generally designated 12. These two elements are connected in series, and two wires leading to the thermostat 10 are designated 13 and 14 respectively.

The elements shown within the dashed line 15 may be located at the heating furnace. A transformer 16 includes a primary connected to a conventional 60 Hz., 117-volt source, and a secondary 17 which generated 24 volts. One terminal of the secondary 17 is connected to the wire 13 (which may be quite long depending upon the separation between the furnace and the thermostat) and to a ganged switch generally designated 18 and referred to as the heat/cool switch. The switch 18 includes two single-pole double throw switches ganged together and designated respectively 18a and 18b. Each of the ganged switches 18a, 18b, includes a terminal designated H for heat and a terminal designated C for cool. The H terminal of the switch 18a is connected to normally open contacts 20 of a relay 21 which is also provided with a coil 22 and a pair of normally closed contacts 23. The normally closed contacts are connected between the C terminal of the switch 18a and the air conditioner, diagrammatically shown within the block 24. The other terminal of the normally open contacts 20 is connected to a heat controller 25, the other terminal of which is connected, together with the other terminal of the air conditioner 24 to the second terminal of the secondary winding 17 of transformer 16.

The wire 14 of thermostat 10 is connected to the coil 22 of relay 21 and to H terminal of the switch 18b, the movable arm of which is connected to a balancing resistor 26. The other terminal of resistor 26 is connected to the second terminal of winding 17.

Figure 2:
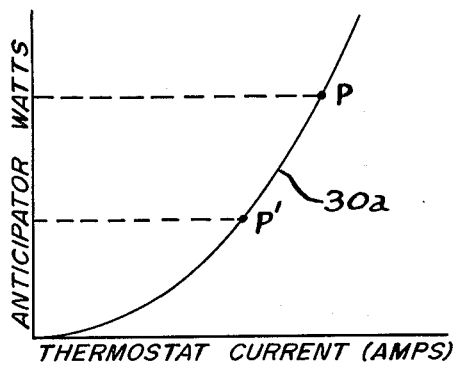
FIG. 2 is an idealized graph of the relationship between watts generated in the heat anticipator resistor and thermostat current for the system of FIG. 1.

Turning then to FIG. 2, the abscissa represents current drawn through the thermostat, and the ordinate represents the number of watts generated in the anticipator resistor 12.

In the heating mode, the system might be designed to operate at point P along the curve 30a which establishes the relationship between thermostat current and anticipator watts. The curve 30a follows a square law since the power dissipated in the heat anticipator resistor 12 is a function of the square of the current. The point P' indicates the operating point for the air conditioning mode, and the power is reduced to one-half of that at point P if the system is to operate at six cycles for heating and three for cooling, since the number of operating cycles is proportional to heat generated in the anticipator.

When the system is set up for heat, the switch 18 is in the position shown in the drawing. When the bimetal switch 11 closes, current flows from the secondary 17 of the transformer 16 through the anticipator resistor 12 to energize the coil 22 of relay 21. This closes the contacts 20 and opens the contacts 23. This arrangement not only provides a function inversion, a mentioned above, but also provides an interlock so that the system cannot operate in both the heating and air conditioning mode at the same time.

When the contacts 20 close, the heat sequencer 25 is energized and fuel is fed to the furnace. The thermostat 10 will draw a certain amount of current as determined by the impedance of the coil 22 and the setting of the anticipator resistor 12, and this current will result in a predetermined amount of heat being generated in the anticipator resistor 12, such that the operating point under design conditions is P in FIG. 2.

The system for operating the blower on the furnace is not shown, and it will be appreciated that even though the contacts 23 are closed, the air conditioner 24 cannot be energized because of the position of the switch 18a. It will also be observed that in the heating mode, the balancing resistor 26 is connected in parallel with the coil 22 of the relay 21. This permits a higher current draw in the heating mode since the operating point P requires a larger current than the operating point P' for air conditioning. This accounts for the different number of operating cycles in the two modes.

When the switch 18 is in the C position, power is fed directly to the air conditioner 24 by means of the normally closed contacts 23; and these contacts remain closed as long as the bimetallic switch 11 is open, indicating that the ambient room temperature is above the thermostat setting. As the room temperature cools, the switch 11 will close, thereby energizing the coil 22 and opening the contacts 23. Heating occurs in the anticipator to "overshoot" a temperature which would otherwise have to be reached before opening the switch 11. This occurs while the air conditioner is not energized. It will be observed that in the cooling mode, the balancing resistor 26 is out of the circuit; hence, the heat anticipator resistor 12 is in series with the coil 22 alone, so that the heat anticipator current in the cooling mode is less than would otherwise have occurred, indicated by the operating point P' in FIG. 2.

Figure 3:
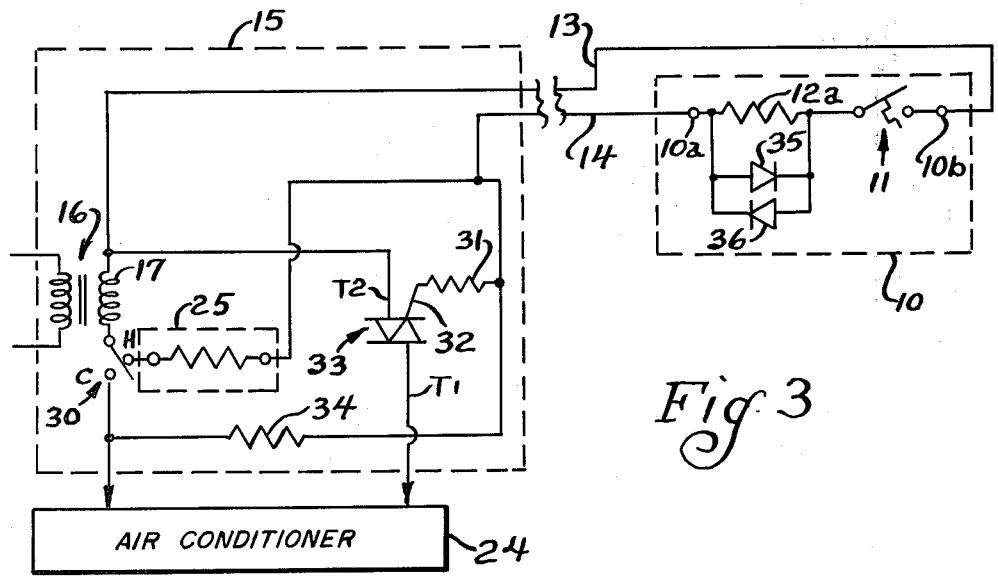
FIG. 3 is a circuit schematic diagram of the system incorporating the present invention.

Turning now to FIG. 3, there is shown a system incorporating the present invention wherein the thermostat is again designated 10, the bimetallic switch 11, a fixed heat anticipator resistor 12a, and the two wires leading to the terminal 13 and 14 respectively. It will be appreciated that the thermostat 10 is a two-wire thermostat requiring only two terminal connections designated respectively 10a and 10b.

System elements located at the heating furnace are enclosed within the block 15; and there is also provided a transformer 16 similar to the previously described transformer and including a secondary 17. A heat controller is also designated 25, and an air conditioner by reference numeral 24.

The wire 13 is connected to one terminal of the secondary 17 of transformer 16. The wire 14 is connected to the heat controller 25, to the gate lead 32 of Triac 33 by means of a resistor 31, and to a resistor 34, the other terminal of which is connected to the second terminal of the secondary winding 17. The modes T1, T2 (sometimes referred to as A2 and A1 respectively) of the Triac 33 are connected respectively to the air conditioner 24 and to the first terminal of the secondary winding 17.

A selector switch 30 has its movable contact connected to the second terminal of secondary winding 17, an H contact connected to the heat controller, and a C contact connected to the air conditioner 24.

A pair of diodes 35, 36 are connected in opposing polarity across the heat anticipator resistor 35a.

As mentioned, Triac 33 has to power terminals designated respectively T1 and T2. When the gate lead 32 is connected to a potential greater than that at terminal R2, the Triac conducts in both directions; and when the gate lead 32 is at the same potential as terminal Tw, the Triac becomes non-conducting. Thus, when the switch 30 is turned to the C position, calling for cool air, the gate lead 32 will be energized through resistors 34 and 31, causing the Triac 33 to conduct AC current. This, in turn, will cause the air conditioner 24 to start, and the system will produce cool air, assuming that the bimetal switch 11 in the thermostat 10 is open (indicating that the room temperature is higher than the thermostat setting). As the room cools, the bimetal switch 11 will close; and this will connect the gate lead 32 of the Triac to the T2 terminal, causing it to become non-conducting, and shutting off the air conditioner 24. With the switch 11 closed, the thermostat will draw current through the resistor 34. Hence, current will flow through the heat anticipator 12a as determined by the operating point Q'. When sufficient heat is generated by the anticipator resistor 12a to raise the temperature of the bimetal switch, that switch will open again, thereby again causing the Triac 33 to conduct and energizing the air conditioner 24. The cycle will continue in this manner, but because the operating point has shifted to one-half the power of the operating point for the heating mode, the number of operating cycles per hour in the cooling mode will be reduced to one-half the number of cycles in the heating mode.

Figure 4:
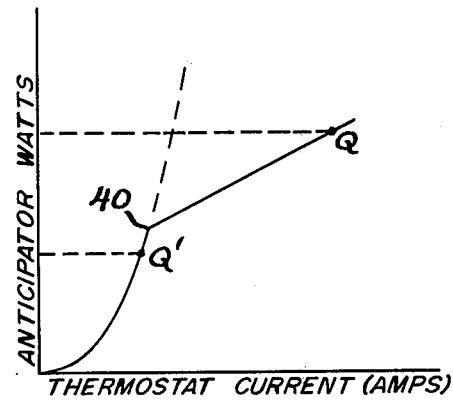
FIG. 4 is an idealized graph of watts generated in the heat anticipator resistor as a function of thermostat current for the system of FIG. 3.

When the selection switch 30 is turned to the H position, the thermostat 10 is connected in series with the heat controller 25. A small amount of power flows through resistor 31, but it is insignificant when compared to current through heat controller 25. The resultant characteristic curve relating watts in the anticipator resistor 12a against current drawn through the thermostat is shown in FIG. 4 wherein Q represents the operating point of the system for heating and Q' represents the operating point of the system for air conditioning. The diodes 35, 36 are silicon diodes, and in oroder to arrive at the resultant characteristic curve, the characteristic of the fixed resistor 12a must be superimposed upon the corresponding characteristic curve of the diodes. Reference numeral 40 indicates a point on the characteristic curve of the thermostat at which the conduction of the diode begins, and it can be seen that the characteristic curve for greater amounts of current levels off substantially as compared to that which would occur without regulation, as indicated by the dashed continuation of the lower portion of the curve.

In the heating mode, the amount of current fed to the anticipator resistor 12a remains constant, and it is substantially independent of the load drawn by the controller 25 because the voltage across the terminals of the resistor 12a is regulated by the diodes 35, 36. Thus, this arrangement can be used in a two-terminal thermostat independent of the load current drawn by the heat controller. This greatly facilitates the installation of a new thermostat in an existing system during conversion to air conditioning because only two wires are employed in the thermostat, and no setting is required for the heat anticipator resistor. This enables one to use the same thermostat with heat controllers drawing different currents (within the range 0.15–0.80 amps), and the same air conditioning function inverter (which is the Triac 33 in the embodiment of FIG. 3). The resulting cycle times for the heat controllers will be within acceptable limits due to the regulation of the rectifier diodes.

When the switch 30 is turned to the cooling mode, the resistor 34 is connected in series with the thermostat 10, and the resistor 34 has a higher impedance than the heat controller 25. Hence, the operating point shifts to Q' in FIG. 4. When the bimetal switch 11 closes, the effect of the diodes 35, 36 is greatly diminished, and the thermostat current is 0.1 amps (below the 0.15 amp limit of the regulated range). Since the diodes 35, 36 are non-conducting for all practical purposes, most of this current flows through the fixed heat anticipator resistor 12a.

It is contemplated that the thermostat 10 will be provided by the manufacturer with the original heating equipment, irregardless of whether air conditioning is also supplied. When it becomes time to add air conditioning, the installer need not make any changes at all to the thermostat. It will be appreciated that the resistance of the resistor 34 is greater than the impedance of the heat controller 25 so as to achieve the power relationship indicated when operating in the two modes.

On the other hand, if the thermostat has not been supplied by the manufacturer, one can easily be installed at the time of conversion, and the installer need not worry about making an adjustment of the heat anticipator resistor because the regulation effect of the diodes in the heating mode is such as to keep the resulting variation of heat cycle times within acceptable limits for all current values in the range 0.15–0.80 amps.

Having thus described in detail a preferred embodiment of the invention, persons skilled in the art will be able to substitute equivalent elements for those shown and to modify the circuitry illustrated while continuing to practice the present invention; and it is, therefore intended that all such modifications and substitutions be covered as they are embraced within the spirit and scope of the appended claims.

I claim:

1. A thermostatic control system for selectively operating either a heat controlling means or an air conditioning means comprising: a source of power; a heat/cool switch having first and second positions; a thermostat connected between said source and said switch and including a bimetal switch, a heat anticipator resistor connected in series with said bimetal switch and voltage regulating means including at least one rectifier diode connected in parallel with said heat anticipator resistor; first and second conductive wires connected between said thermostat and said source and said switch respectively; function inverter means connected in circuit with said source and said thermostat when said switch is in said second position for operating said air conditioner when said bimetal switch is open; and second resistive means having an impedance greater than that of said heat controlling means, whereby when said switch is in said first position, said regulating means is effective to regulate the power to said heat anticipator resistor to a known value, and when said switch is in said second position, said second impedance is connected in series with said thermostat to reduce the current therein below the level at which said diode means is effective to regulate, the power dissipated in said anticipator resistor being proportional to the operating cycle of said unit both in said heating and said cooling means.

2. The system of claim 2 wherein said heat anticipator resistor is a fixed resistor.

3. The system of claim 2 wherein said source is a source of AC voltage and wherein said voltage regulating means comprises a pair of rectifier diodes connected in parallel in opposing polarity, and said pair of diodes is connected in parallel with said anticipator resistor.

4. The system of claim 3 wherein said diodes regulate the voltage across said anticipator resistor in the range of 0.15 to 0.80 amps of current in said anticipator resistor, whereby the number of heating cycles within said range is substantially constant.

* * * * *